United States Patent
Gu et al.

(10) Patent No.: US 11,326,441 B2
(45) Date of Patent: May 10, 2022

(54) SENSOR FUSION AND MODEL CALIBRATION FOR BIT ATTITUDE PREDICTION

(71) Applicant: Halliburton Energy Services, Inc., Houston, TX (US)

(72) Inventors: Qiuying Gu, Humble, TX (US); Robert Darbe, Tomball, TX (US); Julien Christian Valery Marek, Houston, TX (US); Umut Zalluhoglu, Humble, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 167 days.

(21) Appl. No.: 16/453,627

(22) Filed: Jun. 26, 2019

(65) Prior Publication Data

US 2020/0408084 A1 Dec. 31, 2020

(51) Int. Cl.
*E21B 47/024* (2006.01)
*G06F 17/18* (2006.01)
*E21B 44/00* (2006.01)
*G01V 99/00* (2009.01)

(52) U.S. Cl.
CPC ........... *E21B 47/024* (2013.01); *E21B 44/00* (2013.01); *G01V 99/005* (2013.01); *G06F 17/18* (2013.01)

(58) Field of Classification Search
CPC ........ E21B 47/024; E21B 47/02; E21B 47/00; E21B 44/00; G06F 17/18; G06F 17/10; G06F 17/00; G01V 99/005; G01V 99/00; G01V 2200/16; G01V 1/50
See application file for complete search history.

(56) References Cited

U.S. PATENT DOCUMENTS

| | | | |
|---|---|---|---|
| 9,062,528 B2 * | 6/2015 | Mitchell | E21B 47/022 |
| 9,977,061 B2 | 5/2018 | Suwald | |
| 10,323,501 B2 | 6/2019 | Weston et al. | |
| 10,584,574 B2 * | 3/2020 | Benson | E21B 7/04 |
| 2011/0153250 A1 | 6/2011 | Bailey | |
| 2011/0213601 A1 * | 9/2011 | Pirovolou | E21B 7/04 |
| | | | 703/10 |
| 2013/0032401 A1 * | 2/2013 | Edbury | E21B 37/00 |
| | | | 175/24 |

(Continued)

FOREIGN PATENT DOCUMENTS

WO 2018111283 A1 6/2018
WO 2018182870 A1 10/2018

OTHER PUBLICATIONS

PCT Application Serial No. PCT/US2019/039315, International Search Report, dated Mar. 26, 2020, 3 pages.

(Continued)

*Primary Examiner* — Mohamed Charioui
(74) *Attorney, Agent, or Firm* — DeLizio, Peacock, Lewin & Guerra

(57) ABSTRACT

Techniques for estimating a current inclination and azimuth of a drill bit of a wellbore drilling system are described. The estimates for the current inclination and azimuth are generated using measurements obtained for one or more parameters associated with the drilling process performed by the drill bit and taken over a range of the wellbore falling within a sliding window having a predefined distance D extending along the wellbore.

20 Claims, 6 Drawing Sheets

(56) References Cited

U.S. PATENT DOCUMENTS

2014/0231141 A1* 8/2014 Hay ................... E21B 47/00
175/45

OTHER PUBLICATIONS

PCT Application Serial No. PCT/US2019/039315, International Written Opinion, dated Mar. 26, 2020, 5 pages.
Berger, et al., "Improving Wellbore Position Accuracy of Horizonal Wells By Using a Continuous Inclination Measurement From a Near Bit Inclination MWD Sensor", Society of Petroleum Engineers, 1998 SPE International Conference on Horizontal Well Technology, Nov. 1-4, 1998, 9 pages.

* cited by examiner

SENSOR FUSION AND MODEL CALIBRATION FOR BIT ATTITUDE PREDICTION

TECHNICAL FIELD

The present disclosure relates to drilling subterranean wellbores. In particular, the present disclosure relates to estimating and modeling one or more parameters associated with a drilling system for drilling wellbores in geological formations.

BACKGROUND

Drilling for hydrocarbons, such as oil and gas, typically involves operation of a drilling tool at underground depths that can reach down to thousands of feet below the surface. Such remote distances of the downhole drilling tool, combined with unpredictable downhole operating conditions and vibrational drilling disturbances, creates numerous challenges in accurately steering the drilling tool to reach a set target. Sensors, located at or near a bottom hole assembly (BHA), detect various conditions related to the drilling, such as orientation of the drilling tool, characteristics of the rock formation, pressure, temperature, acoustics, and/or radiation. Such sensor measurement data is typically transmitted to the surface, where human operators analyze it to steer the downhole drilling tool to reach a set target.

BRIEF DESCRIPTION OF THE DRAWINGS

Embodiments of the disclosure may be better understood by referencing the accompanying drawings.

Figure 1:
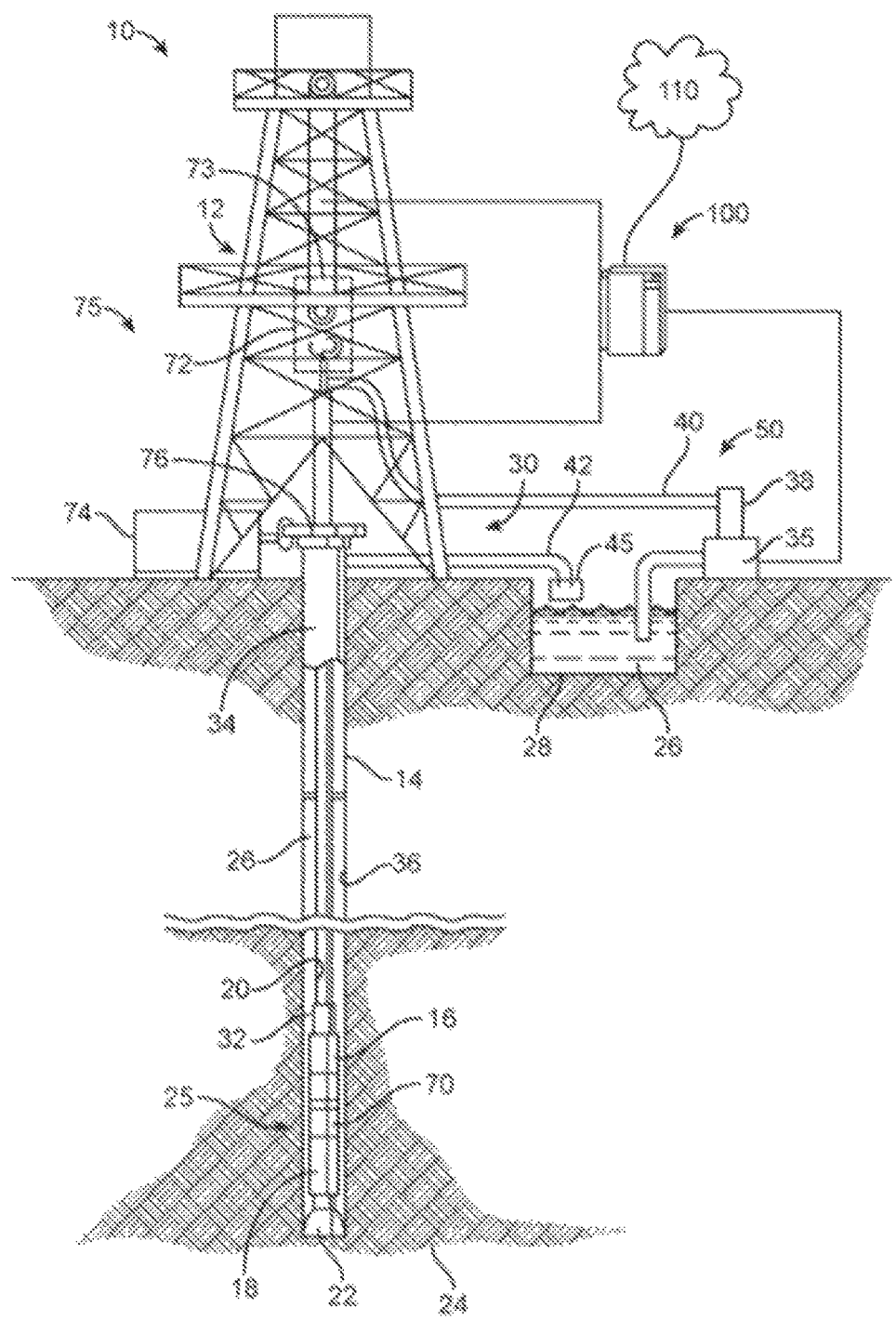
FIG. 1 illustrates a schematic view of a wellbore operating environment in which a drilling control apparatus, method, and system may be deployed in accordance with embodiments of the present disclosure.

The drawings are provided for the purpose of illustrating example embodiments. The scope of the claims and of the disclosure are not necessarily limited to the systems, apparatus, methods, or techniques, or any arrangements thereof, as illustrated in these figures.

DETAILED DESCRIPTION

The description that follows includes example systems, methods, techniques, and program flows that symbolize embodiments of the disclosure. However, it is understood that this disclosure may be practiced without these specific details. In some instances, well-known instruction requests, protocols, structures and techniques have not been shown in detail in order not to obfuscate the description.

For autonomous drill-bit-steering controls to accurately track a reference wellbore plan, the autonomous drilling system needs accurate estimates of the current bit inclination, azimuth, and position as well as accurate estimates of parameter values in the predictive models that the autonomous drilling system uses to plan its next control movements. Various embodiments allow for the accurate estimation of bit inclination and azimuth and of the model parameters required for the prediction of future values of bit inclination and azimuth. Additionally, such operations can be performed automatically as drilling progresses.

Estimates of current drill bit inclination and azimuth and estimates of parameters within predictive models can be produced by a moving horizon weighted least square regression algorithm using available measurement data over a specified data window. This window can be specified in terms of distance D, and can stretch from the current bit measured depth backwards D units. Different types of measurements available from sensor packages along the bottom-hole assembly (BHA) can be combined by use of measurement weights in order to produce the most accurate estimates.

In some embodiments, the simplification of the estimation problem to a least square form and the use of a moving window are chosen to reduce computational load so the calculations can be performed by a downhole processor while drilling is in process. The use of measurement weights allows the incorporation of many types of sensor types within the estimation procedure. The weights also determine how much each measurement influences the final parameter estimates.

In computer-aided directional drilling, the goal can be to drill according to a predefined well plan that gives a specified wellbore inclination and azimuth at each measured depth. The available control handles for these quantities can include weight-on-bit, steering force (bit deflection for point-the-bit rotary steerable systems (RSS)—steering ratio, or a proxy for the steering force, which applies more specifically to push-the-bit RSS), and tool-face angle. These latter two quantities can be controlled by actuators on the BHA.

According to some embodiments, operations include determination of the current bit azimuth and inclination as well as the model parameters that allow for future prediction of bit azimuth and inclination for a given set of control inputs. The model parameter determination can be referred to as parameter estimation or system identification. The determination of current bit azimuth and inclination can be referred to as state estimation. Using measurement weights, the effect of each measurement on the estimates can be tuned according to its measurement type and its distance from the current bit position. For example, more accurate measurement types closer to the bit can be more heavily weighted than measurements taken further away or using a less accurate sensor type.

FIG. 1 illustrates a schematic view of a wellbore operating environment 10 in which a drilling control apparatus, method, and system may be deployed in accordance with embodiments of the present disclosure. The wellbore operating environment 10 includes a plurality of drilling subsystems. For example, FIG. 1 depicts the wellbore operating environment 10 as including a bottom hole assembly (BHA) subsystem 25, drilling fluid subsystem 50, and a rig subsystem 75. However, the wellbore operating environment 10 may include any number of subsystems so long as there is a plurality of subsystems. Additionally, each of the subsystems illustrated in FIG. 1 may be further divided into additional subsystems or may themselves be included in other subsystems without departing from the scope and spirit of the present disclosure.

As depicted in FIG. 1, the wellbore operating environment 10 may include a drilling rig 12 disposed atop a borehole 14. The drilling rig 12 includes a drill string 20 disposed within the borehole 14. A BHA subsystem 25 is located at the downhole end of the drill string 20. The BHA subsystem 25 includes a drill bit 22 that carves a borehole 14 through the formations 24. The BHA subsystem 25 further includes a fluid-driven motor assembly 70 that drives drill bit 22. The BHA subsystem 25 may provide directional control of the drill bit 22. In at least one aspect of the present disclosure, the drill bit 22 is a rotatable drill bit and the BHA subsystem 25 is a steerable drilling BHA subsystem that includes a Measurement While Drilling (MWD) system with the sensors 18 to provide information about formations 24 and downhole drilling parameters. The MWD sensors in the BHA subsystem 25 may include, but are not limited to, a device for measuring the formation resistivity near the drill bit, a gamma ray device for measuring the formation gamma ray intensity, devices for determining the attitude of the drill bit, and pressure sensors for measuring drilling fluid pressure downhole.

The MWD sensors may also include additional/alternative sensing devices for measuring shock, vibration, torque, of for telemetry, etc. The BHA subsystem 25 may further include actuators capable of steering the drill bit 22 or otherwise adjusting the path direction of the drill bit 22 and drill string 20. In at least one aspect of the present disclosure, the BHA subsystem 25 includes a subsystem controller capable of processing data obtained from sensors 18 to adjust the path direction of the drill bit 22 and drill string 20 by sending command signals to one or more actuators capable of adjusting or controlling the path direction. The sensors 18 may transmit data to a surface control unit 100 on the earth's surface using telemetry such as conventional mud pulse telemetry systems or any wired, fiber optic, or wireless communication system. The surface control unit 100 may process or further communicate the sensor data in accordance with the embodiments of the present disclosure as described herein.

In at least one aspect of the present disclosure, the BHA subsystem 25 may include a Logging While Drilling (LWD) System with additional sensors or logging tools 16. The logging tools 16, sensors, or instruments, can be any conventional logging instrument such as acoustic (sometimes referred to as sonic), neutron, gamma ray, density, photoelectron, nuclear magnetic resonance, or any other conventional logging instrument, or combinations thereof, which can be used to measure lithology or porosity of formations surrounding an earth borehole. The sensors or logging tools 16 may transmit data to a surface control unit 100 on the earth's surface using telemetry such as conventional mud pulse telemetry systems or any wired, fiber optic, or wireless communication system. The surface control unit 100 may process or further communicate the sensor data in accordance with the embodiments of the present disclosure as described herein. Surface control unit 100 may also be communicatively coupled to a network 110, such as the internet, a local area network (LAN), a wide area network (WAN), or another type of communications network that allows surface control unit 100 to communicate with other networked devices.

The BHA subsystem 25 may additionally include sensors in conjunction with the fluid-driven motor assembly 70 that monitors the revolutions per minute (RPM) of the fluid-driven motor assembly 70 and that identifies changes in torque or power needed by the motor to maintain constant rotation, such as a torque meter. Such sensors may be internal or external to the fluid-driven motor assembly 70.

In addition to MWD and LWD sensors and instrumentation, wireline instrumentation may also be used in conjunction with the BHA subsystem 25. The wireline instrumentation may include any conventional logging instrumentation which can be used to measure the lithology and/or porosity of formations surrounding an earth borehole, for example, such as acoustic, neutron, gamma ray, density, photoelectric, nuclear magnetic resonance, or any other conventional logging instrument, or combinations thereof, which can be used to measure lithology.

As depicted in FIG. 1, a drilling fluid subsystem 50 pumps drilling mud 26 from a mud storage pit 28 near the well head 30, down an axial passageway (not illustrated) through the drill string 20, through the fluid-driven motor assembly 70, and out of apertures in the drill bit 22. After exiting the apertures in the drill bit 22, the drilling mud 26 flows back to the surface through the annular region 32 between the drill string 20 and the sidewalls 36 of the borehole 14. Metal casing 34 may be positioned in the borehole 14 above the drill bit 22 for maintaining the integrity of an upper portion of the borehole 14 and for preventing fluid transmission between borehole 14 and formations 24. The annular region 32 between the drill string 20 and the sidewalls 36 of the borehole 14 forms the return flow path for the drilling mud 26.

The drilling fluid subsystem 50 causes drilling mud 26 to be pumped from the mud storage pit 28 near the well head 30 by one or more pumps 38. The drilling fluid subsystem 50 may include one or more sensors capable of measuring the pumping rate or the downhole drilling fluid flow rate. The drilling fluid subsystem 50 may further include one or more actuators capable of adjusting or controlling the pumps 38, including the pumping rate or the downhole drilling fluid flow rate. The drilling mud may travel through a mud supply line 40 which is coupled with a central passageway extending throughout the length of the drill string 20 and exits into the borehole through apertures in the drill bit 22 for cooling and lubricating the drill bit and carrying the formation cuttings produced during the drilling operation back to the surface. The cuttings and mud mixture are passed through a fluid exhaust conduit 42, coupled with the annular region 32 at the well head 30, and into a trough system 45 that includes shakers and an optional centrifuge (not shown). The shakers separate a majority of solids, such as cuttings and fines, from the drilling mud. Cleaned mud is then returned to the mud storage pit 28.

The drilling fluid subsystem 50 may include sensors capable of analyzing the nature as well as the volume, quantity, or weight of the cuttings and fines being removed by the shaker included in the trough system 45. Additionally, the drilling fluid subsystem 50 may include sensors capable of determining the particle size distribution (PSD) of the cuttings, the density of the cuttings, and/or visual characteristics of the cuttings. For example, the drilling fluid subsystem 50 may include sensors capable of determining that the cuttings are not being efficiently cleaned out of the hole, which could in turn cause the drill bit 22 or drill string 20 to get stuck downhole.

Numerous other problems and corrective actions may be similarly identified based on particular surrounding circumstances and measurements made by the drilling fluid subsystem 50 sensors. For example, a greater than expected amount of fluid could indicate an inefficiency of the shakers that could be corrected by various adjustments, such as changes to the screen desk angle, vibration, G-force and cuttings conveyance velocity. The drilling fluid subsystem 50 may include actuators capable of adjusting or controlling the performance of the shakers or optional centrifuges. For example, the drilling fluid subsystem 50 may include actuators capable of adjusting or controlling shaker parameters such as screen desk angle, vibration, and G-force.

The drilling fluid subsystem 50 may further include one or more sensors capable of determining the fluid properties of the drilling fluid. In conjunction with drilling fluid property sensors, the drilling fluid subsystem 50 may also include one or more mixers 35 capable of controlling the drilling fluid properties by mixing mud obtained from the mud storage pit with appropriate additives. For example, the mixers 35 of the drilling fluid subsystem 50 may control the rheological properties of the drilling fluid as well as the density, mud equivalent circulating density (ECD), electrical stability, percent solids, oil/water ratio, acidity (pH), salinity, and particle size distribution. The drilling fluid subsystem 50 may include one or more actuators capable of controlling the properties of the drilling fluid. For example, actuators included in the drilling fluid subsystem 50 may control additive supply valves, feed rates, mixture composition, discharge rates, and other aspects of the mixing process.

As used herein, the term "drilling mud" may be used interchangeably with "drilling fluid" to refer to both drilling mud alone and a mixture of drilling mud and formation cuttings, or alternatively, to refer to both drilling fluid alone and a mixture of drilling fluid and formation cuttings.

The wellbore operating environment 10 may further include a rig subsystem 75. The rig subsystem 75 may include a top drive motor 72, a draw-works 73, a rotary table 76, and a rotary table motor 74. The rotary table motor 74 may rotate the drill string, or alternatively the drill string may be rotated via a top drive motor 72. The rig subsystem 75 at least in part drives the drill bit 22 of the BHA subsystem 25 by providing sufficient weight-on-bit (WOB), revolutions per minute (RPM) and torque to create the hole. The rig subsystem 75 may include one or more sensors capable of measuring, for instance, revolutions per minute (RPM), weight-on-bit (WOB), torque-on-bit (TOB), rate of penetration (ROP), well depth, hook load, and/or standpipe pressure. Additionally, the rig subsystem 75 includes actuators capable of adjusting or controlling drilling parameters such as RPM, WOB, TOB, and ROP. For example, the hook load and top drive rotational speed may be changed over time by one or more actuators.

In the wellbore operating environment 10 each subsystem may include a subsystem controller that is communicatively coupled with at least one subsystem sensor and at least one subsystem actuator. The subsystem controller is capable of receiving measurement data collected by subsystem sensors and determining a local subsystem state from measurements received from the subsystem sensors. As used herein, the "local subsystem state" refers to a time-dependent subsystem state or set of subsystem states that may be directly measured by a sensor or calculated or estimated, at least in part, from one or more sensor measurements.

The subsystem controller is also capable of sending command signals to subsystem actuators to cause the actuators to adjust or control one or more drilling control parameters. Actuators can convert the command signals from control systems into actions such as movement of a control valve shaft or the change of speed of a pump. Command signals to actuators can at least be electrical, pneumatic, hydraulic, acoustic, or electromagnetic radiation, or various combinations thereof. Actuators can at least be of various kinds, including variable speed motors, variable speed drives, pneumatic actuators, electrical actuators, hydraulic actuators, rotary actuators, servo motor actuators, or various combinations thereof. In some cases, the subsystem controller may send command signals to a lower level controller capable of causing actuation of an actuator to adjust or modify a drilling control parameter in accordance with the command signal sent by the subsystem controller. The lower level controllers may be relatively simple controllers such as a proportional-integral-derivative (PID) type controller and/or a control loop feedback mechanism controller.

The subsystem controller may include any suitable computer, controller, or data processing apparatus capable of being programmed to carry out the method and apparatus as further described herein. An example of such a subsystem controller is illustrated in and further described below with respect to FIG. 4.

Figure 2A:
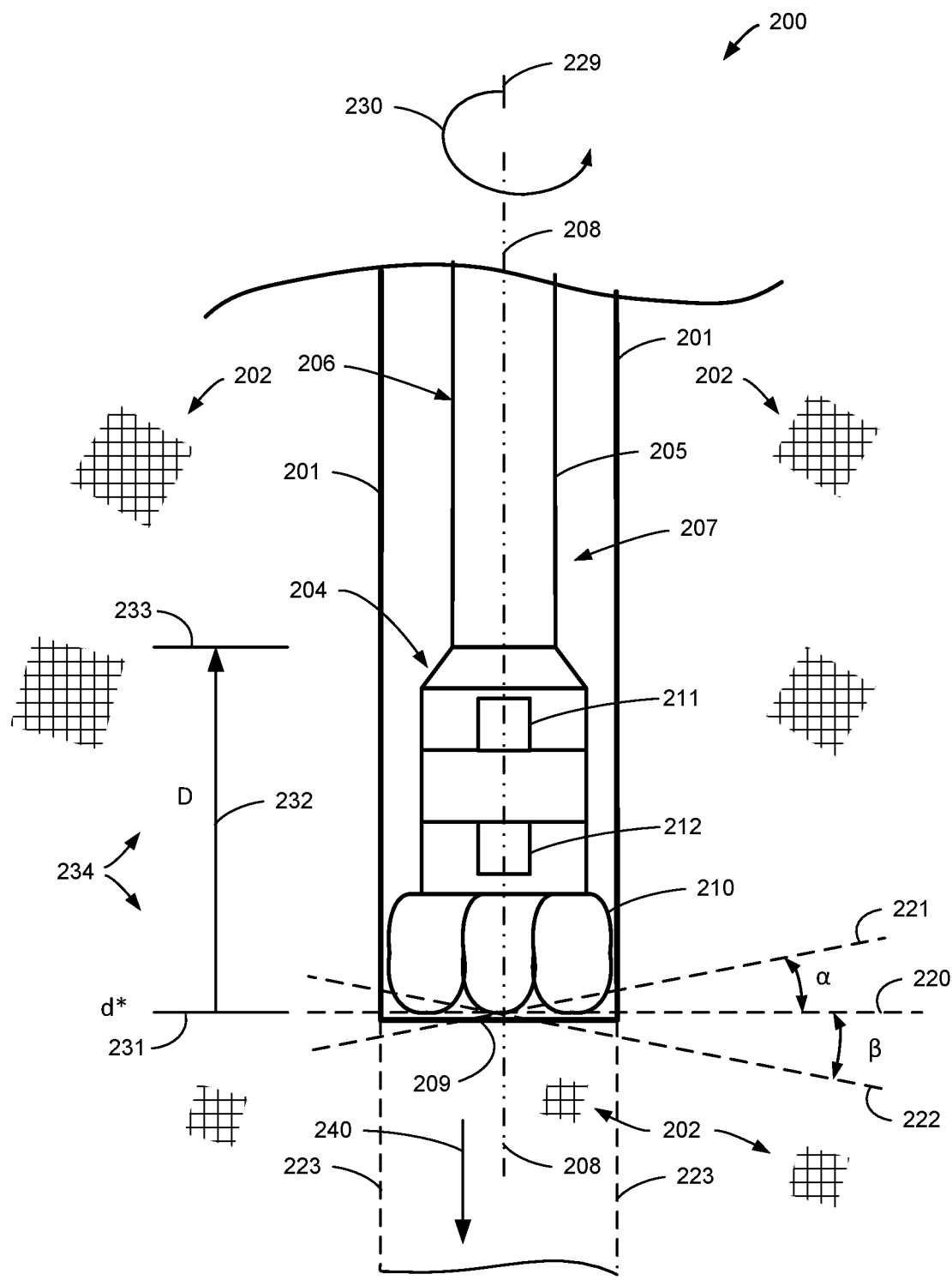
FIG. 2A illustrates a schematic diagram of a portion of an example drill string assembly positioned in a borehole.

FIG. 2A illustrates a schematic diagram 200 of a portion of an example drill string assembly 206 positioned in a borehole 207. Borehole 207 has a vertical orientation formed by sidewalls 201. Drill string assembly 206 includes pipe 205 coupled to bottom hole assembly 204 at a first end of pipe 205. Pipe 205 extends upward within borehole 207 to physically couple to additional equipment such as additional pipes, draw-works, and a rotary table in a manner as illustrated and described above with respect to drill string 20 of the wellbore operating environment 10 and FIG. 1.

As shown in FIG. 2A, bottom hole assembly 204 includes sensors 211, actuators 212, and drill bit 210. Sensors 211 are not limited to any particular number and/or types of sensors, and may include any number of sensors and/or any type of sensors that may be used to take measurements and/or determine one or more parameters related to the drill string assembly 206 and/or borehole 207. Sensors 211 may be communicatively coupled to processing devices, (not shown in FIG. 2A, but for example surface control unit 100 as shown in FIG. 1), and provide data, in some examples in real-time, to the one or more processing devices. The data may include values for sensed measurements that were measured by the sensors 211 and that are related to one or more parameters associated with the drill string assembly 206 and/or borehole 207. Actuators 212 are not limited to any particular type of actuator devices, and may include electrical, pneumatic, or hydraulic devices, or any combination thereof. Actuators 212 in some examples are configured to rotate drill bit 210 in a rotary motion around an axis of the drill bit. Actuators 212 in some examples include actuator devices configured to control and position the inclination of the face of the drill bit 210 relative to an axis of the bottom hole assembly 204. By controlling the inclination of the face of drill bit 210, actuators 212 may be able to steer the drilling direction of the drill bit 210 as the drill bit proceeds to drill further into and extend the borehole 207 in a direction generally indicated by arrow 240.

As further shown in FIG. 2A, borehole 207 extends in a substantially vertical orientation along longitudinal axis 208 through a formation 202. An inclination of the drill bit 210 is generally indicated by dashed line 220 and may be generally perpendicular to longitudinal axis 208. Dashed line 220 may be understood to be an edge of a plane extending to the right and left of longitudinal axis 208, and also extending perpendicularly in all directions in a 360-degree radius around longitudinal axis 208. In various examples, actuators 212 are configured to manipulate the inclination of drill bit 210 so that the plane represented by dashed line 220 is no longer perpendicular to longitudinal axis 208 in all radial directions surrounding the longitudinal axis. For example, actuators 212 may manipulate drill bit 210 so that the inclination for drill bit 210 slopes upward toward the right-hand side of FIG. 2A along dashed line 221 and at an angle alpha (α) relative to the longitudinal axis 208.

In another example, actuators 212 may manipulate drill bit 210 so that the inclination of the drill bit slopes downward toward the right-hand side of FIG. 2A along dashed line 222 and at an angle beta (β) relative to longitudinal axis 208. Estimates related to the current azimuth of drill bit 210 are also important in relation to determining the current inclination relative to the rotational position 230 of the drill bit 210 around the longitudinal axis 208. In some examples, the rotational position 230 is measured in terms of the rotational position of the drill string assembly 206 relative to a fixed position 229. In some examples the fixed position is a geographical orientation, such as true north.

The variations used to control the inclination of drill bit 210 may then be used to steer the direction of the further boring of the borehole 207 as the drill bit is rotated and allowed to progress further into the formation 202 past the bottom of the existing borehole (generally indicated at 209). Control of the inclination of the drill bit 210, in conjunction with other drilling parameters such as bit weight, drilling fluid parameters, and rotational speed of the drill bit, are important in maintaining the direction of the borehole 207 along a planned path for the borehole. As shown in FIG. 2A, drill bit 210 is positioned at or near the bottom end (indicated by 209) of borehole 207. The planned path for the extension of borehole 207 is indicated by arrow 240 having sidewalls 223 extending through formation 202. In order to proceed along the desired path, control over the inclination of drill bit 210 is required.

Estimates of the current drill bit inclination and azimuth are important for making further decisions related to controlling the inclination of the drill bit in order to maintain the drilling operation along the planned path. Further, estimates of the drill bit inclination and azimuth may be used in conjunction with the predictive model or models as described herein used to generate control input information for controlling the actuators 212 and thus the inclination of drill bit 210 as the drilling process proceeds in order to best maintain the actual path of the borehole 207 along the desired planned path. In some example, even when the desired planed path continues along a vertical orientation as shown in FIG. 2A, control and adjustments to the inclination of drill bit 210 may be required due to factors such as material changes in the formation 202 being contacted by the drill bit and flexure in the drill string itself, among other factors.

Sensors 211 may make any number of repetitive measurements related to parameters of the drill string assembly 206, the formation 202, and/or the borehole 207 as drilling of the borehole progresses. In some examples, any measurements taken by sensors 211 or other sensors monitoring the operation of the drill string assembly 206 that were taken within a sliding window along the longitudinal axis 208 of borehole 207 may be applied to one or more predictive models to provide an estimate of the current inclination and azimuth of drill bit 210. As shown in FIG. 2A, in some examples the sliding window extends from a position d* (at line 231), representing the current position of the face of the drill bit 210, and extending backward (upward direction in FIG. 2A) along the longitudinal axis 208 to a predefined distance D, represented by arrow 232, to the top of the sliding window 234 at line 233. Distance D is not limited to any particular distance, and may be for example one or more inches, or for example one or more feet. The number of measurements taken by sensors 211 for any given measurement or measured parameter taken over distance D is not limited to any particular number of measurements, and may represent a few, such as two or three measurements, or thousands of measurements taken over the distance D.

As further described below, each of the measurements taken while the drill bit 210 operated within the range of the borehole specified by the sliding window 234 may be individually weighted. For example, measure that were taken closer to the current position of the drill bit 210 (closer to line 231) may be given a heavier weighting value, while these same type measurements that were taken further upward within the sliding window (closer to line 233) may be given progressively smaller weighting values as the distance from line 231 where the measurement was taken become closer to the top of the sliding window. In some examples, the type of sensor and/or the accuracy of the sensor used for sensing the measurements may be used to determine the weighting applied to measurements taken over the window D by that particular sensor. In some examples, measurements taken by a more accurate or by a particular type sensor may be given heavier weighting than a same or similar type of measurement taken by a less accurate sensor.

Using the weighted measurements taken over the sliding window 234 for the current drill bit position, parameters for a predictive model or models are estimated using an optimization algorithm, in some examples using but not limited to a least square regression algorithm. The estimated parameters are then provided to the predictive model or models in order to generate the estimates for the current drill bit inclination and azimuth. These estimates may then be used as a basis for controlling actuators 212 to manipulate the inclination of drill bit 210 in order to maintain the extending boring of borehole 207 in conformance with the desired borehole path. In some examples, the parameters may be estimated as often as a new measurement or set of measurements is received. In other examples, the estimate of the parameters and the inclination and azimuth of the drill bit may be performed when the current position of drill bit 210 has advanced some predefined distance along the longitudinal axis 208 from the position where the drill bit was when the last set of parameters was estimated. In other examples, the estimate of the parameters and the inclination and azimuth of the drill bit may be performed on some predetermined and regular time interval. In some examples, one or more of these techniques may be used alone or in combination to determine when the estimate of the parameters and the inclination and azimuth of the drill bit may be performed. For example, estimates may be generated at some regular time interval as long as the drill bit depth has changed (increased) in a forward direction some minimum amount.

The set of measurements included in any iteration of estimating the model parameters, inclination, and azimuth may be taken from a set of measurements made within the sliding window 234 having distance D, wherein the sliding window also slides forward while maintaining distance D within the sliding window in connection with the advancement of the drill bit 210 as the drill bit extends borehole 207 further into the formation 202 along the drill path. Use of the estimated drill bit inclination and azimuth may include use of these estimates to maintain the drill path of the borehole in a generally vertical direction as shown in FIG. 2A. However, the use of these estimated drill bit inclinations and azimuths using the techniques described herein is not limited to drilling vertical boreholes, and may be used to aid the drilling of non-vertical sections of a borehole, as further illustrated for example in FIG. 2B.

Figure 2B:
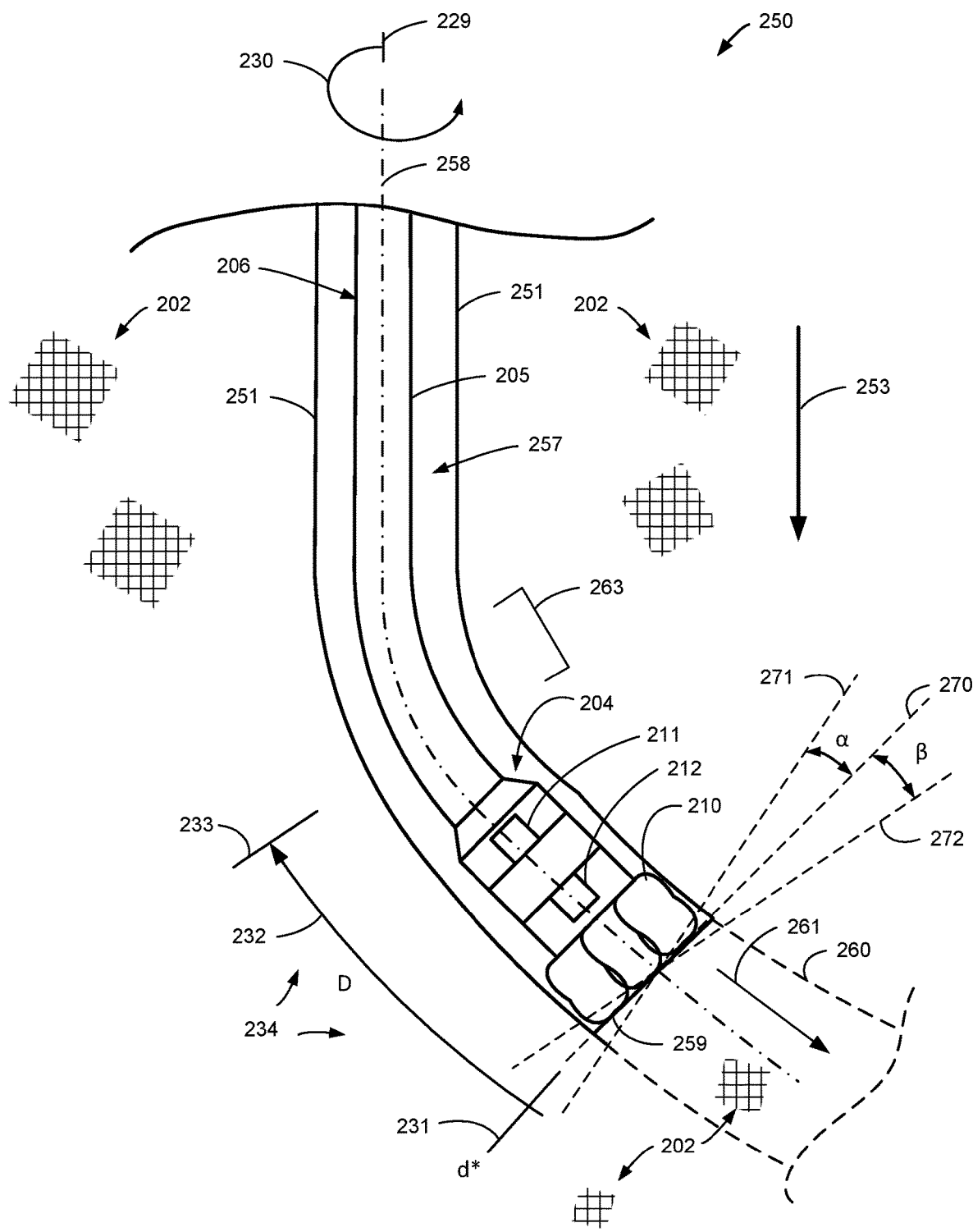
FIG. 2B illustrates a schematic diagram of a portion of another example drill string assembly positioned in a borehole.

FIG. 2B illustrates a schematic diagram 250 of a portion of another example drill string assembly 206 positioned in a borehole 257 formed by sidewalls 251. Duplicate reference number in FIG. 2B correspond to a same or a similar object or device having the same reference number used in FIG. 2A. In FIG. 2B, a drill string assembly 206 including bottom hole assembly 204 and drill bit 210 are illustrated. Bottom hole assembly 204 includes sensors 211 and actuators 212 that may be the same or similar devices and/or configurations to perform the same or similar functions and provide the same or similar features as these devices were described above with respect to FIG. 2A.

FIG. 2B differs from FIG. 2A in that the path of borehole 257 depicted in FIG. 2B is vertical for a first portion of the borehole, but begins to bend away from the vertical orientation in area 263, and continues on a curved path to the right in FIG. 2B along longitudinal axis 258 of the borehole. The drill bit 210 is positioned at or near the current location of the current bottom 259 of borehole 257. Sliding window 234 extends backward from the current position of the drill bit, indicated as d* at line 231 to a distance D, to the top of sliding window 234 at line 233. The path for the well plan for borehole 257 extending past the current bottom 259 of the borehole is indicated by dashed lines 260.

An estimate of the current position of drill bit 210 at line 231 may be based on obtaining a value for the true depth of drill bit 210, for example the distance taken by the path of longitudinal axis 258 from a dashed line 270 to a fix point along longitudinal axis 258, such as the surface elevation level of formation 202 (not shown in FIG. 2B). As further shown in FIG. 2B, borehole 257 extends in a curved path to the right in FIG. 2B through formation 202. An inclination of the drill bit 210 is generally indicated by dashed line 270 and may be generally perpendicular to longitudinal axis 258, wherein longitudinal axis 258 has an angle of orientation at the current location of drill bit 210 that is non-vertical for example relative to a gravitational vector represented by arrow 253. Dashed line 270 may be understood to be an edge of a plane extending to the right and left of longitudinal axis 258, and also extending perpendicularly in all directions in a 360-degree radius around longitudinal axis 258.

In various examples, actuators 212 are configured to manipulate the inclination of drill bit 210 so that the plane represented by dashed line 270 is no longer perpendicular to longitudinal axis 258 in all radial directions surrounding the longitudinal axis. For example, actuators 212 may manipulate drill bit 210 so that the inclination for drill bit 210 slopes upward toward the right-hand side of FIG. 2A along dashed line 271 and at an angle alpha ($\alpha$) relative to the longitudinal axis 258. In another example, actuators 212 may manipulate drill bit 210 so that the inclination of the drill bit slopes less upward toward the right-hand side of FIG. 2B along dashed line 272 and at an angle beta ($\beta$) relative to longitudinal axis 258.

Using measurements taken by sensors 211 or other devices while drill bit 210 was positioned along longitudinal axis 258 and drilling within the portion of longitudinal axis 258 included within the defined by sliding window 234, weightings to these measurements may be applied, estimates for model parameters generated and applied to least squared optimization algorithms to provide an estimate of the current drill bit inclination and azimuth using any of the techniques described above with respect to FIG. 2A, or otherwise described herein. These estimates of the current drill bit inclination and azimuth may then be used to generate further control inputs for actuators 212 for the purpose of controlling the inclination of the drill bit 210 to allow further drilling of borehole 257 along the desired well path defined by dashed lines 260 in the direction indicated by arrow 261.

Figure 3:
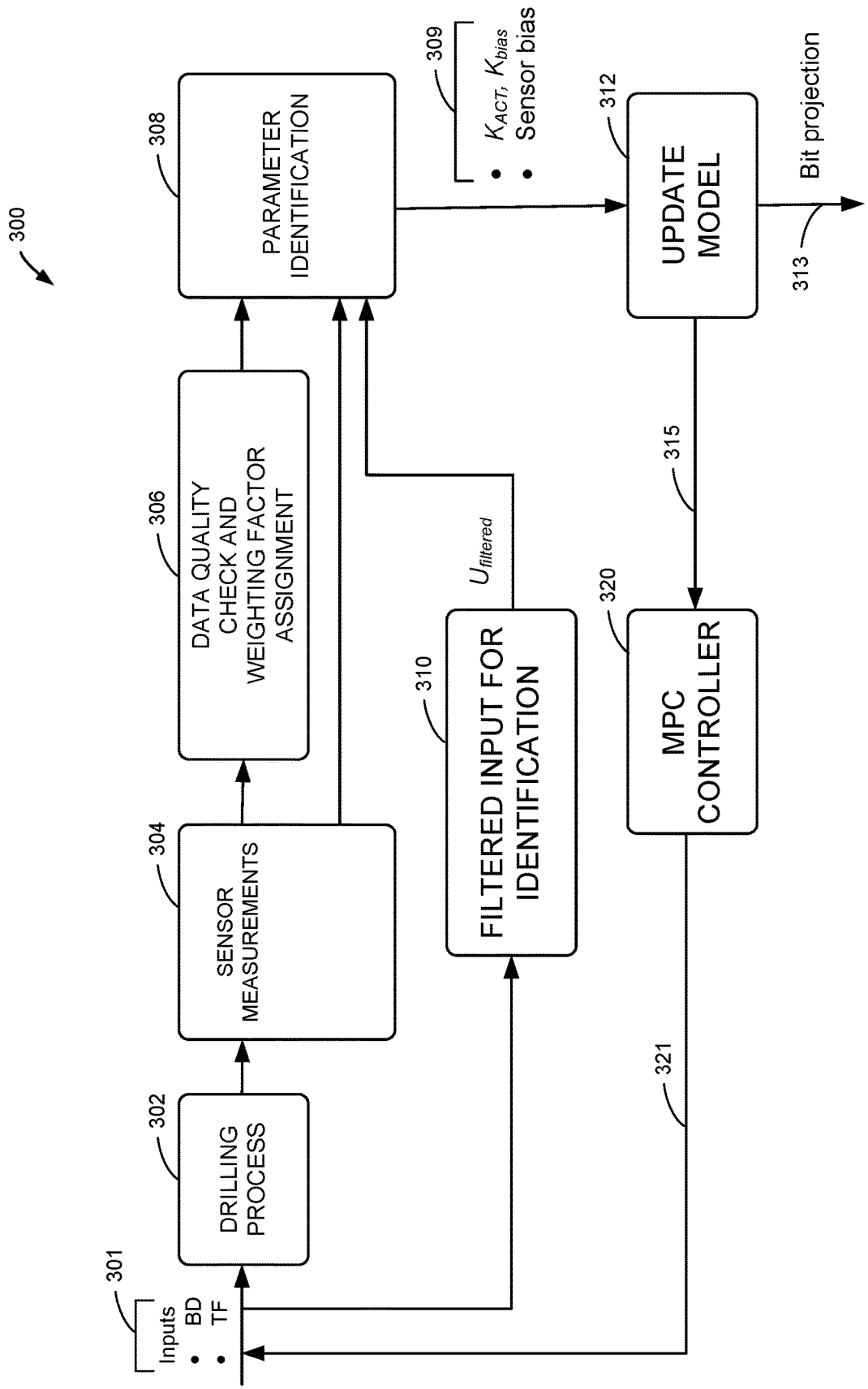
FIG. 3 illustrates a flow diagram of a method used to determine drill bit inclination and azimuth according to various embodiments of the disclosure.

FIG. 3 illustrates a flow diagram 300 of a method used to determine drill bit inclination and azimuth according to various embodiments. Inputs to diagram 300 are indicated by bracket 301. Inputs may include data indicating bit deflection (BD) of the system being modeled or to be modeled by the method of the flow diagram 300. The term bit deflection may be used to refer to steering actuation amount. The term bit deflection may also refer to as steering force, steering ratio, slide ratio, pad force, etc., depending on the steering actuation system used in the drilling tool. Inputs may also include tool face (TF) or any other drilling parameters such as weight-on-bit, rotation speed (RPM), or flow rate. A drilling process is performed at block 302. The drilling process includes advancing the drill bit further through a geological formation, in most cases along a pre-planned drill path.

As the drilling process is occurring, one or more sets of measurements are made, for example by sensors of a wellbore system, as represented by block 304. The types of measurements made, and the types of sensor used to make the measurements, are not limited to any particular type of measurements or to any particular types of sensors making these measurements. Measurements may be made by one or more sensor packages located along the drill string and/or as part of the bottom-hole-assembly (BHA). The measurements may include a set of measurements taken during the time when the drill bit is positioned within a predefined sliding window. The sliding window has a predetermined value for a distance D, wherein distance D represents a linear distance from the current position of the face of the drill bit and extending backward the distance D along a longitudinal axis of the borehole already formed by the drilling process. The window is a sliding window because as the face of the drill bit moves forward as part of the drilling process, the sliding window is also moved forward so that the leading edge of the window is defined to be at the current position of the face of the drill bit, and having the sliding window extending backward that same predefined distance D from the current position of the drill bit. As such, the distance D included within the sliding window remains at a same linear distance value, wherein the portion of the borehole defined to be within the sliding window itself moves along the borehole path as the drill bit progresses forward along the drill path.

As various times all of the measurements taken from within a given sliding window are further processed at block 306. The time when a set of measurements included within a given sliding window are processed is not limited to a particular time interval or to a particular trigger event. In some examples, the processing at block 306 occurs each time a new set of measurements is captured at block 304. In other examples, the processing at block 306 may occur at some predefined time interval, such as every second, or multiple times per second, or a time interval longer than one second. The processing of the measurements at block 306 may include a data quality check on the measured values received as the measurements. For example, the measured values included in the measurements may be checked against an expected range of values for a particular measurement to assure that the actual measurement value(s) falls within the expected range, and thus include a reasonable value or set of values for that particular measurement.

The measurements at block 306 are also assigned a weighting factor. For example, each particular type of measurement, e.g., each survey measurement taken within the sliding window, may be weighted based on its relative position within the sliding window. In some examples, the survey measurements that were taken closer to the current position of the drill bit within the sliding window are given a heavier weighting than survey measurements taken at a position within the sliding window that are further away from the current position of the drill bit. The entire set of survey measurements taken within the sliding window may be progressively weighted based on their relative positions within the sliding window where the measurements where respectively taken. In a similar manner, the additional sets of any types of measurements, such as the measurements associated with various surveying packages, may be weighted based on their relative positions within the sliding window where these measurements were taken, for example relative to the position where the respective measurements were taken relative to the current position of the drill bit.

In some examples, the weighting of the measurement data is based on the measurement type. For example, more accurate measurement types may be more heavily weighted than a less accurate type of measurement for a same or similar measured parameter and/or for measurements taken at a same position within the sliding window. In some examples, the weighting of a measurement or measurements at block 306 may include a weighting factor determined based both on the distance from the current drill bit position within the sliding window where the measurement was taken and the type of measurement, for example the accuracy or the measurement parameter being measured that the measurement data represents.

Once the processing at block 306 has been completed, the weighted measurements are applied to an algorithm at block 308. Block 308 in some examples also receives filtered input for identification, $U_{filtered}$, from block 310. In some embodiments, filtering inputs includes averaging the inputs over a finite distance. In some embodiments, filtering inputs includes synchronizing the sampling rate with the sensor measurement sampling rate for one or more sensors so that these sampling rates are synchronized before being forward on for use by block 308.

In some examples, the algorithm at block 308 is a parameter identification algorithm configured to generate a set of model parameters generally indicated by bracket 309. In some examples, the parameter identification algorithm includes a least square parameter identification algorithm. In some examples, block 308 includes constrained parameters. The model parameters may include parameters describing the curvature-generation capability of the BHA in a wellbore in inclination and azimuth planes (maximum rate of change of inclination—build rate—and maximum rate of change of azimuth—walk rate—over a distance). Multiple parameters could be used to define this, such as one parameter, (Kact), that represents the contribution of the steering actuation applied by BHA to create the generated curvature; and another parameter (Kbias) that represents the contribution of external effects on the generated curvature, such as formation forces and gravity.

The model parameters generated at block 308 are applied to a predictive model at block 312. Output from the predictive model at block 312 is configured to generate outputs 315 including an estimate of the current drill bit inclination and current drill bit azimuth. The outputs 315 may be applied to a controller at block 320. The controller at block 320 generates outputs 321 used to control the positioning and inclination of the drill bit for further inputs to the drilling process being performed at block 302. In addition, output 313 may be provided by the predictive model at block 312 to be used in modeling the drill bit projection relative to a drill plan for the desired path of the borehole going forward.

In the case of inclination, the problem is to predict, bit inclination θ, and build rate $K_θ$ (drop rate if negative) for a given sequence of control inputs u. The simple dynamic prediction model is given in state space form by Equation (1):

$$\begin{bmatrix} \dot{K}_\theta \\ \dot{\theta} \end{bmatrix} = \begin{bmatrix} -\frac{1}{\tau} & 0 \\ 1 & 0 \end{bmatrix} \begin{bmatrix} K_\theta \\ \theta \end{bmatrix} + \begin{bmatrix} \frac{1}{\tau} & 1 \\ 0 & 0 \end{bmatrix} \begin{bmatrix} K_{inc} u \\ K_{bias} \end{bmatrix} \qquad (1)$$

wherein τ is the inclination time constant, Kinc is the input gain, Kbias is the Kθ bias, and [˙] represents a derivative with respect to measured depth. Kinc and Kbias are the parameters to be estimated as the drilling progresses based on measurements of θ (e.g., at block 308 in FIG. 3). These parameters can be estimated as often as a new measurement is received. Based on these parameter estimates, the prediction model can then be used to predict future inclinations and build rates (e.g., block 312 in FIG. 3).

Examples of the methods described herein utilize the sliding window, which incorporates the drill bit's current measured depth, denoted d*, and extends backwards a predefined distance D along the measured depth. As described above, the available sensor measurements along the segment of distance D are extracted for model calibration. To create a series of model outputs for this sliding window, embodiments of the method use the discretized form of the state-space prediction model. First define:

$$A = e^{\begin{bmatrix} -\frac{1}{\tau} & 0 \\ 1 & 0 \end{bmatrix} \delta}$$

$$B = \int_0^\delta e^{\begin{bmatrix} -\frac{1}{\tau} & 0 \\ 1 & 0 \end{bmatrix} w} dw$$

$$C = \begin{bmatrix} 0 & 1 \end{bmatrix}$$

wherein A represents the state or system matrix, B represents the input matrix, and δ is the discretization step in distance units. Then, the discretized form of the prediction model equation becomes Equation (2):

$$\begin{bmatrix} K_\theta \\ \theta \end{bmatrix}_{d+\delta} = A \begin{bmatrix} K_\theta \\ \theta \end{bmatrix}_d + B \begin{bmatrix} K_{inc} u_d \\ K_{bias} \end{bmatrix}. \qquad (2)$$

As noted above, the parameter δ is the discretization step in distance units, which will be assumed 1 for the remainder. For a given initial condition $$\begin{bmatrix} \widehat{K_\theta} \\ \hat{\theta} \end{bmatrix}_{d^*-D}$$

and model parameters $\hat{K}_{inc}$ and $\hat{K}_{bias}$, the estimates of θ over the window are obtained from Equation (3) as follows:

$$\begin{bmatrix} \hat{\theta}_{d^*-D+1} \\ \hat{\theta}_{d^*-D+2} \\ \vdots \\ \hat{\theta}_{d^*} \end{bmatrix} = \begin{bmatrix} CA \\ CA^2 \\ \vdots \\ CA^D \end{bmatrix} \begin{bmatrix} \vec{K}_\theta \\ \hat{\theta} \end{bmatrix}_{d^*-D} + \quad (3)$$

$$\begin{bmatrix} C & 0 & 0 & 0 \\ CA^1 & C & 0 & 0 \\ \vdots & \vdots & \ddots & \vdots \\ CA^{D-1} & CA^{D-2} & \ldots & C \end{bmatrix} \left( \frac{1}{\tau} \begin{bmatrix} u_{d^*-D} \\ u_{d^*-D+1} \\ \vdots \\ u_{d^*-1} \end{bmatrix} \hat{K}_{inc} + \begin{bmatrix} 1 \\ 1 \\ \vdots \\ 1 \end{bmatrix} \hat{K}_{bias} \right)$$

Equation (3) may be simplified to the form of Equation (4) as follows:

$$\hat{\theta} = \overline{CA} \begin{bmatrix} \vec{K}_\theta \\ \hat{\theta} \end{bmatrix}_{d^*-D} + U_{filt,d} \hat{K}_{inc} + \quad (4)$$

$$D_{filt,d} \hat{K}_{bias} = \begin{bmatrix} \overline{CA} & U_{filt,d} & D_{filt,d} \end{bmatrix} \begin{bmatrix} \begin{bmatrix} \vec{K}_\theta \\ \hat{\theta} \end{bmatrix}_{d^*-D} \\ \hat{K}_{inc} \\ \hat{K}_{bias} \end{bmatrix} = X\hat{K}$$

Actuations of control input u are denoted $u_d$ where d is the measured depth of the bit at the time that $u_d$ occurred. Along the well path, measurements of θ are denoted $\theta_d^x$ where x denotes the sensor number and d is the measured depth that measurement $\theta_d^x$ corresponds to. Each sensor measurement has a weighting factor denoted $w_d^x$, where x denotes the sensor number and d is the measured depth that measurement $w_d^x$, corresponds to.

The weights determine how much each response value influences the final parameter estimates. In various examples, a high-quality data point influences the fit more than a low-quality data point. In some examples, each sensor measurement type may have its weighting factor adjusted to be inversely proportional to the accuracy of the sensor. The accuracy may be evaluated by performing a statistical comparison against survey data or may be based on historical experience. Within the measurements from the same sensor, the measurement may be weighted differently also, with more recent measurements more highly weighted for example.

Once the measurement data and predictions are extracted along backward distance D from the bit, model parameter estimation is proposed to be solved using weighted least squares regression, which minimizes the weighted error summations using Equation (5) as follows:

$$S = \Sigma_x \Sigma_d w_d^x (\theta_d^x - \hat{\theta}_d)^2 \quad (5)$$

In some examples, all of the measurements are compiled into column vector $\theta^{meas}$ and the corresponding diagonal matrix W has its diagonal to be the vector of all weights assembled in the same order as $\theta^{meas}$. Each measurement $\theta_d^x$ has an associated measured depth d, and these are compiled in column vector $d^{meas}$. Each column of the matrix $X = [\overline{CA} \; U_{filt,d} \; D_{filt,d}]$ can be interpolated according to the measurement locations contained in $d^{meas}$ and recompiled into a matrix X', and $\hat{\Theta}' = X'\hat{K}$ can be defined as the predictions associated with the measurements in $\theta^{meas}$. Then, the weighted least square parameter estimation is equivalent to minimizing Equation (6) as follows:

$$S' = (\theta^{meas} - \hat{\Theta})^T W (\theta^{meas} - \hat{\Theta}) \quad (6)$$

The solution of weighted least square parameter estimation is shown by Equation (7) as follows:

$$\hat{K} = \begin{bmatrix} \hat{K}_{\theta,d^*-D} \\ \hat{\theta}_{d^*-D} \\ \hat{K}_{inc} \\ \hat{K}_{bias} \end{bmatrix} = (X'^T W X')^{-1} X'^T W \theta^{meas} \quad (7)$$

After the parameter vector $\hat{K}$ has been estimated, it can be used to predict current state estimates $\hat{\theta}_{d^*}$ and $\hat{K}_{\theta,d^*}$ which are simply the final elements of $\hat{\Theta} = X\hat{K}$. The updated model can also be used to generate future predictions, for example by simply propagating forward from the initial condition using Equation 2.

In some examples, the parameter estimates $\hat{K}_{inc}$ and $\hat{K}_{bias}$ might be constrained to a physically realizable or other user-defined range. In that case, the objective in Equation (6) and constraints shown as Equation (8) as follows:

$$\hat{K}_{inc,min} \leq \hat{K}_{inc} \leq \hat{K}_{inc,max}$$

$$\hat{K}_{bias,min} \leq \hat{K}_{bias} \leq \hat{K}_{bias,max} \quad (8)$$

These constraints together form a quadratic program type of optimization problem. The trade-off for adding constraints on the parameter estimates may include increased computational burden compared to the simple linear projection of Equation (7).

In comparison to other methods for estimating the drill bit inclination and azimuth, the methods and techniques described in this disclosure are not recursive, since the results at any time do not depend on the results previously obtained. This is in contrast for example to recursive Kalman Filter based methods, which may require higher computational load to perform the estimation of the drill bit inclination and azimuth. Use of the methods and techniques described here may lead to lower computational loads. Further, the original Kalman Filter is restricted to pure state estimation using linear models so cannot be used for parameter estimation. The nonlinear Extended Kalman Filter (EKF) can be modified for simultaneous state and parameter estimation, but has been found to be unstable. Also, the Kalman Filter methods require an estimate of the initial state, which leads to an additional optimization problem needing to be solved, eliminating this advantage over the current methods and techniques described herein. Compared to at least the Kalman Filter based methods, the methods and techniques described in this disclosure are simple in form and should have no numerical stability issues.

Figure 4:
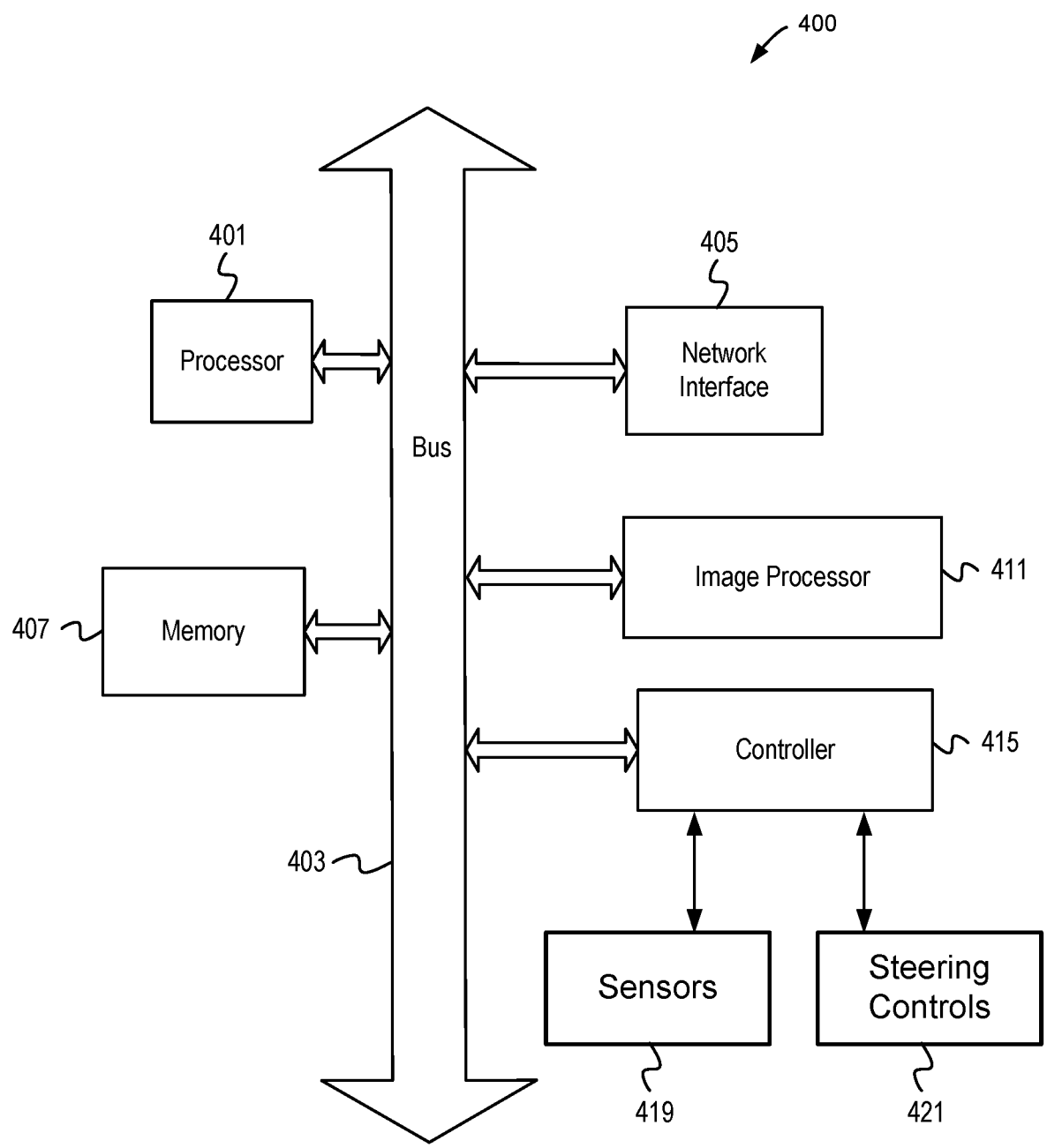
FIG. 4 illustrates a block diagram of an example computing system that may be employed to practice the concepts, methods, and techniques disclosed herein, and variations thereof.

FIG. 4 illustrates a block diagram of an example computing system 400 that may be employed to practice the concepts, methods, and techniques disclosed herein, and variations thereof. The computing system 400 incudes a plurality of components of the system that are in electrical communication with each other, in some examples using a bus 403. The computing system 400 may include any suitable computer, controller, or data processing apparatus capable of being programmed to carry out the method and apparatus as further described herein.

The computing system, which may be a general-purpose computer, includes a processor 401 (possibly including multiple processors, multiple cores, multiple nodes, and/or implementing multi-threading, etc.). The computer includes memory 407. The memory 407 may be system memory (e.g., one or more of cache, SRAM, DRAM, zero capacitor RAM, Twin Transistor RAM, eDRAM, EDO RAM, DDR RAM, EEPROM, NRAM, RRAM, SONOS, PRAM, etc.) or any one or more of the possible realizations of machine-readable media. The computer system also includes the bus 403 (e.g., PCI, ISA, PCI-Express, HyperTransport® bus, InfiniBand® bus, NuBus, etc.) and a network interface 405 (e.g., a Fiber Channel interface, an Ethernet interface, an internet small computer system interface, SONET interface, wireless interface, etc.).

The computer may also include an image processor 411 and a controller 415. The controller 415 can control the different operations that can occur in the response inputs from sensors 419 and/or calculations based on inputs from sensors 419 using any of the techniques described herein, and any equivalents thereof, to generate outputs to steering controls 421. For example, the controller 415 can communicate instructions to the appropriate equipment, devices, etc. to alter control the inclination of the drill bit performing a drilling operation being monitored by the sensors 419. Any one of the previously described functionalities may be partially (or entirely) implemented in hardware and/or on the processor 401. For example, the functionality may be implemented with an application specific integrated circuit, in logic implemented in the processor 401, in a co-processor on a peripheral device or card, etc. Further, realizations may include fewer or additional components not illustrated in FIG. 4 (e.g., video cards, audio cards, additional network interfaces, peripheral devices, etc.). As illustrated in FIG. 4, the processor 401 and the network interface 405 are coupled to the bus 403. Although illustrated as also being coupled to the bus 403, the memory 407 may be coupled to the processor 401 only, or both processor 401 and bus 403.

Controller 415 may be coupled to sensors 419 using any type of wired or wireless connection(s), and may receive data, such as measurement data, obtained by sensors 419. Sensors 419 may include any of the sensors associated with a wellbore environment, a drill string, and/or a bottom hole assembly as described herein. Measurement data may include any of the data associated with a geological formation and/or measurements obtained during the drilling process of the geological formation. Measurement data may also include a measured current depth for the drill bit being used to perform the drilling process as measured by the sensors, and any measurement data obtained by the sensors over the path of the wellbore being drilled by the drill bit as part of the drilling process. Controller 415 may include circuitry, such as analog-to-digital (A/D) converters and buffers that allow controller 415 to receive electrical signals directly from one or more of sensors 419, and/or data provided as an output from one or more of sensors 419.

A predetermined value for the distance D associated with the sliding window extending from the current drill bit position backward along the longitudinal axis of the wellbore formed by the drilling process may be stored in any of the memory locations accessible by computing system 400, such as memory 407. The predetermined value for distance D may be used to determine which of the measurement data obtained along the well borehole are to be included in the measurements taken within the sliding window, an thus to be included in the calculations performed to determine the model parameters and the estimates of the current drill bit inclination and azimuth as described above with respect to FIGS. 2A, 3B, and 3. At least one value for distance D may be entered through an input device (not shown in FIG. 4) such as a computer keyboard, that is coupled to network interface 405, for example by a system user, and stored in any of the memory devices included in computing system 400 for use in performing the methods and techniques described in this disclosure, and/or any equivalents thereof.

Steering controls 421 may also be coupled to controller 415. Any of the outputs, including the estimates of the current drill bit inclination and azimuth that may be generated in part or in whole using computing system 400 and/or as described herein may be provided as outputs to steering controls 421. Controller 415 may include circuitry (not specifically shown in FIG. 4) such as buffer and driver circuitry, that allow controller 415 to provide electrical signals and/or data output signal to steering controls 421. Outputs provided to steering controls 421 may include just the estimates of the current drill bit inclination and azimuth that may be generated in part or in whole using computing system 400. In that example, steering controls 421 may include one or more subsystems that are configured to generate additional steering control parameters based on the estimates of the current drill bit inclination and azimuth. These additional steering control parameters may be provided as outputs to actuators (such as actuators 212, FIGS. 2A, 2B) to control for example the inclination of the drill bit and thus control the drilling process going forward.

In other examples, other portions of computing system 400 may further process the estimates of the current drill bit inclination and azimuth to generate additional steering control parameters based on the estimates of the current drill bit inclination and azimuth. These additional steering control parameters may be communicated to steering controls 421 and applied to actuators (such as actuators 212, FIGS. 2A, 2B) through steering controls 421 in order to control for example the inclination of the drill bit going forward as the drilling process proceeds, and thus control for example a direction of the wellbore and the drilling process going forward. The generation of the additional steering control parameters may be based on a modeling of the current state of the drilling process in view of a wellbore plan for how the path of the wellbore should proceed going forward.

With respect to computing system 400, basic features here may easily be substituted for improved hardware or firmware arrangements as they are developed. In some examples, memory 407 includes non-volatile memory and can be a hard disk or other types of computer readable media which can store data that are accessible by a computer, such as magnetic cassettes, flash memory cards, solid state memory devices, digital versatile disks (DVDs), cartridges, RAM, ROM, a cable containing a bit stream, and hybrids thereof.

It will be understood that one or more blocks of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus. As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. While depicted as a computing system 400 or as a general purpose computer, some embodiments can be any type of device or apparatus to perform operations described herein.

Figure 5:
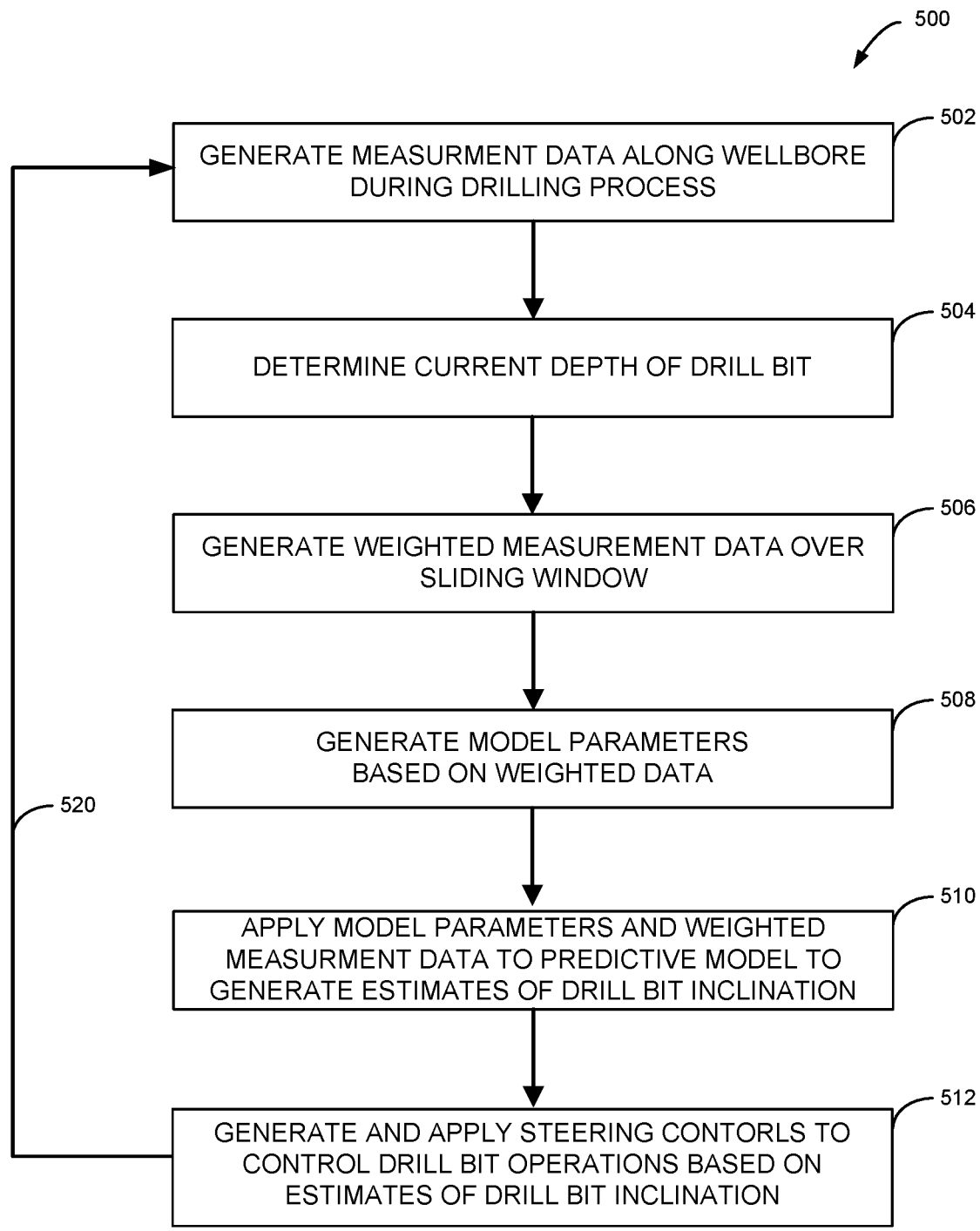
FIG. 5 illustrates a flowchart of an example method according to various embodiments of the disclosure.

FIG. 5 illustrates a flowchart of an example method 500 according to various embodiments of the disclosure. Method 500 in some examples may be performed in whole or in part by one or more processors, such as processors located in surface control unit 100 as illustrated and described with respect to FIG. 1. In some examples method 500 may be performed by one or more processors, such as processor 401 in FIG. 4, located in a bottom hole assembly, such as bottom hole assembly 25 as illustrated and describe with respect to FIG. 1, and/or bottom hole assembly 204 as illustrated and described with respect to FIGS. 2A and 2B.

Referring to FIG. 5, method 500 includes generating measurement data along a wellbore during a drilling process (block 502). Measurement data may include data obtained by one or more sensors located in the borehole where a drilling process is or has taken place. The number and types of sensors used to obtain the measurement data is not limited to any particular number or types of sensor(s), and may include any type of sensor data sensed by or derived from sensed measurements taken by the sensors during a drilling operation. Measurement data is not limited to any particular type of data, and may include multiplicity of measurement data from different sensor packages, or data derived from this data. The measurement data may be collected at various intervals along the path of the borehole being drilled, and stored in a memory device, such as memory 407 of computing system 400 as illustrated and described above with respect to FIG. 4.

Referring to FIG. 5, method 500 further includes determining a current depth for the drill bit that is being used to perform the drilling operation of the wellbore (block 504). The determination of the current depth of the drill bit may be designated as "d*". The determination of the current depth for the drill bit is not limited by any particular method or technique, and may include any method or technique that would be understood by one of ordinary skill in the art. Drill bit depth in some examples may be tracked on the surface using the block height and continuously counting the number of drill pipes. The determined drill bit depth may be communicated to downhole devices and/or sensors with a telemetry system. The drill bit depth may also be estimated downhole on the drilling tool using the available sensors and a rate of penetration model. In some examples, the determination of the depth of the drill bit may be based on the estimation of the current position of the face of the drill bit.

Using the determined current depth of the drill bit, method 500 proceeds to generate weighted measurement data for measurement data collected over a sliding window (block 506). The sliding window is determined to include measurement data obtained during the drilling operation along the borehole starting from the current drill bit position (determined current depth of the drill bit) and extending backward along the already drilled borehole for a distance D. As such, the sliding window is configured to include measurement data obtained along the already drilled borehole and within the length of the sliding window that extends from the d* current position of the drill bit backward a distance D along the longitudinal axis of the borehole. Taking the measurement data that falls within the sliding window, method 500 includes tuning the measurement data by weighting each of the measurements included in the measurement data falling within the sliding window. Weighting of the measurement data may be based on the relative position of each of the data measurement relative to the current position of the drill bit, or based on the type and/or determined accuracy of the measurement data, or a combination of both the relative position and the type/accuracy of the measurement data.

The triggering of the collection and weighting of the measurement data is not limited to any particular time interval or triggering event. In some examples, the measurement data falling within the sliding window may be collected and weighted each time a new set of measurements becomes available. In some example the measurement data falling within the sliding window may be collected and weighted at some predetermined and iterative time interval, such as every second, or some fraction of a second, or at a time interval that is more than one second. In some examples, the trigger for the collection and weighting of the measurement data may be based on the drill bit having progressed a triggering distance forward in the drilling process, and thus having the sliding window also moving along with the drill bit the same triggering distance, such as a minimum linear distance, since the last time the measurement data was collected over the sliding window and weighted. As would be understood by one of ordinary skill in the art, various combinations of these triggering techniques may be used to determine when the collection and weighting of the measurement data will occur.

Method 500 includes generating model parameters based on the weighted measurement data (block 508). In some examples, the model parameters are generated using Equations 3 and 4 as described above. Once the model parameters have been generated, method 500 includes applying the model parameters and weighted measurement data to a predictive model to generated estimates of the current drill bit inclination and azimuth (block 510). The model parameters and the predictive model may include a least squares regression algorithm used to generate the estimate of the drill bit inclination and azimuth. The predictive model may incorporate the use some combination of Equations 5-8 as described above. The application of the model parameters to the predictive model is used to generate an estimated values for the current drill bit inclination and azimuth.

Method 500 may include the generation of steering controls based on the estimated values for the current drill bit inclination and azimuth (block 512). These steering controls may be provided to a steering controls system that utilized the estimated values for the drill bit inclination and azimuth to control devices, such as actuator coupled to the drill bit in order to control the drill bit operations based on the estimated values. The further drilling operations being controlled by the steering controls is then monitored as feedback (arrow 520) to generate new measurements data along the wellbore as the drilling process continues.

The flowcharts are provided to aid in understanding the illustrations and are not to be used to limit scope of the claims. The flowcharts depict example operations that can vary within the scope of the claims. Additional operations may be performed; fewer operations may be performed; the operations may be performed in parallel; and the operations may be performed in a different order. It will be understood that each block of the flowchart illustrations and/or block diagrams, and combinations of blocks in the flowchart illustrations and/or block diagrams, can be implemented by program code. The program code may be provided to a processor of a general-purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing. Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine. The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

While the aspects of the disclosure are described with reference to various implementations and exploitations, it will be understood that these aspects are illustrative and that the scope of the claims is not limited to them. In general, techniques for estimating a drill bit inclination and azimuth as described herein may be implemented with facilities consistent with any hardware system or systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed.

The following examples are provided.

Example 1: A method comprising: obtaining one or more measurements associated with a drill bit drilling a borehole, the one or more measurements measured within a sliding window extending along the borehole from a current depth position of the drill bit backward a predetermined distance D along a longitudinal axis of the borehole; weighting the one or more measurements obtained within the sliding window to generate one or more weighted measurements; estimating a set of model parameters based on the one or more weighted measurements; and applying the estimated set of model parameters to a predictive model to generate an estimate of a current inclination of the drill bit.

Example 2. The method of example 1, wherein the predictive model generates the estimate of the current inclination of the drill bit using a least squares regression algorithm.

Example 3. The method of examples 1 or 2, wherein the weighting of the one or more measurements comprises weighting each of the one or more measurements based on a relative position within the sliding window where each of the one or more measurements was taken.

Example 4. The method of any of examples 1-3, wherein the one or more measurements taken at a position closest to the current depth position of the drill bit are given a heavier weighting relative to the one or more measurements taken at a one or more positions farther away from the current depth position of the drill bit.

Example 5. The method of any of examples 1-4, wherein the weighting of the one or more measurements is based at least in part on an accuracy of a sensor or a type of sensor making the one or more measurements.

Example 6. The method of any of examples 1-5, wherein data included in the one or more measurements comprises survey data.

Example 7. The method of any of examples 1-6, wherein estimating the set of model parameters further comprises constraining a set of values of the set of model parameters to a physically realizable or a user-defined range.

Example 8. The method of any of examples 1-7, wherein applying the estimated set of model parameters to the predictive model further comprises generating an estimated value for a current azimuth of the drill bit.

Example 9. The method of any of examples 1-8, further comprising: outputting the estimate of the current inclination of the drill bit to a steering control system; and controlling one or more actuators using the steering control system based at least in part on the estimate of the current inclination of the drill bit.

Example 10. A system comprising: a drill string configured to drill a borehole in a geological formation, the drill string comprising a bottom hole assembly and a drill bit, the bottom hole assembly comprising one or more actuators configured to control an inclination of the drill bit; and a device configured to: obtain one or more measurements associated with the drill bit, the one or more measurements measured within a sliding window extending along the borehole from a current depth position of the drill bit backward a predetermined distance D along a longitudinal axis of the borehole; weight the one or more measurements obtained within the sliding window to generate one or more weighted measurements; estimate a set of model parameters based on the one or more weighted measurements; and apply the estimated model parameters to a predictive model to generate an estimate of a current inclination of the drill bit.

Example 11. The system of example 10, wherein the device is configured to output the estimate of the current inclination of the drill bit to a steering control system; and wherein the steering control system is configured to control the one or more actuators based at least in part on the estimate of the current inclination of the drill bit.

Example 12. The system of examples 10 or 11, wherein the device is located within the bottom hole assembly.

Example 13. The system of any of examples 10-12, wherein the device is further configured to generate the estimate of the current inclination of the drill bit using a least square regression algorithm.

Example 14. The system any of any of examples 10-13, wherein the device is further configured to weight each of the one or more measurements based on a relative position within the sliding window where the measurement was taken, and wherein the one or more measurements taken at a position closest to the current depth position of the drill bit are given a heavier weighting relative to the one or more measurements taken at a one or more positions farther away from the current depth position of the drill bit.

Example 15. The system of any of examples 10-14, wherein the device is further configured to weight the one or more measurements, estimate the set of model parameters, and apply the estimated model parameters to the predictive model to generate the estimate of the current inclination of the drill bit each time of new set of the one or more measurements is obtained.

Example 16. The system of any of examples 10-15, wherein the device is further configured to weight the one or more measurements based at least in part on an accuracy of a sensor or on a type of sensor making the one or more measurements.

Example 17. The system of any of examples 10-16, wherein the device is further configured to generate an estimate of a current azimuth of the drill bit using the predictive model.

Example 18. One or more non-transitory machine-readable storage medium having program code executable by a processor to cause the processor to: obtain one or more measurements associated with a drill bit drilling a borehole, the one or more measurements measured within a sliding window extending along the borehole from a current depth position of the drill bit backward a predetermined distance D along a longitudinal axis of the borehole; weight the one or more measurements obtained within the sliding window to generate one or more weighted measurements; estimate a set of model parameters based on the one or more weighted measurements; and apply the estimated model parameters to a predictive model to generate an estimate of a current inclination of the drill bit.

Example 19. The one or more storage medium of example 18, wherein the predictive model generates the estimate of the current inclination of the drill bit using a least squares regression algorithm.

Example 20. The one or more storage medium of examples 18 or 19, wherein the weighting of the one or more measurements comprises weighting each of the one or more measurements based on a relative position within the sliding window where each of the one or more measurements was taken.

What is claimed is:

1. A method comprising:
   obtaining one or more measurements associated with a drill bit drilling a borehole, the one or more measurements measured within a sliding window extending along the borehole from a current depth position of the drill bit backward a predetermined distance D along a longitudinal axis of the borehole;
   weighting the one or more measurements obtained within the sliding window to generate one or more weighted measurements;
   estimating a set of model parameters based on the one or more weighted measurements; and
   applying the estimated set of model parameters to a predictive model to generate an estimate of a current inclination of the drill bit.

2. The method of claim 1, wherein the predictive model generates the estimate of the current inclination of the drill bit using a least squares regression algorithm.

3. The method of claim 1, wherein the weighting of the one or more measurements comprises weighting each of the one or more measurements based on a relative position within the sliding window where each of the one or more measurements was taken.

4. The method of claim 1, wherein the one or more measurements taken at a position closest to the current depth position of the drill bit are given a heavier weighting relative to the one or more measurements taken at a one or more positions farther away from the current depth position of the drill bit.

5. The method of claim 1, wherein the weighting of the one or more measurements is based at least in part on an accuracy of a sensor or a type of sensor making the one or more measurements.

6. The method of claim 1, wherein data included in the one or more measurements comprises survey data.

7. The method of claim 1, wherein estimating the set of model parameters further comprises constraining a set of values of the set of model parameters to a physically realizable or a user-defined range.

8. The method of claim 1, wherein applying the estimated set of model parameters to the predictive model further comprises generating an estimated value for a current azimuth of the drill bit.

9. The method of claim 1, further comprising:
outputting the estimate of the current inclination of the drill bit to a steering control system; and
controlling one or more actuators using the steering control system based at least in part on the estimate of the current inclination of the drill bit.

10. A system comprising:
a drill string configured to drill a borehole in a geological formation, the drill string comprising a bottom hole assembly and a drill bit, the bottom hole assembly comprising one or more actuators configured to control an inclination of the drill bit; and
a device configured to:
obtain one or more measurements associated with the drill bit, the one or more measurements measured within a sliding window extending along the borehole from a current depth position of the drill bit backward a predetermined distance D along a longitudinal axis of the borehole;
weight the one or more measurements obtained within the sliding window to generate one or more weighted measurements;
estimate a set of model parameters based on the one or more weighted measurements; and
apply the estimated set of model parameters to a predictive model to generate an estimate of a current inclination of the drill bit.

11. The system of claim 10,
wherein the device is configured to output the estimate of the current inclination of the drill bit to a steering control system; and
wherein the steering control system is configured to control the one or more actuators based at least in part on the estimate of the current inclination of the drill bit.

12. The system of claim 10, wherein the device is located within the bottom hole assembly.

13. The system of claim 10, wherein the device is further configured to generate the estimate of the current inclination of the drill bit using a least square regression algorithm.

14. The system of claim 10, wherein the device is further configured to weight each of the one or more measurements based on a relative position within the sliding window where the measurement was taken, and wherein the one or more measurements taken at a position closest to the current depth position of the drill bit are given a heavier weighting relative to the one or more measurements taken at a one or more positions farther away from the current depth position of the drill bit.

15. The system of claim 10, wherein the device is further configured to weight the one or more measurements, estimate the set of model parameters, and apply the estimated set of model parameters to the predictive model to generate the estimate of the current inclination of the drill bit each time of new set of the one or more measurements is obtained.

16. The system of claim 10, wherein the device is further configured to weight the one or more measurements based at least in part on an accuracy of a sensor or on a type of sensor making the one or more measurements.

17. The system of claim 10, wherein the device is further configured to generate an estimate of a current azimuth of the drill bit using the predictive model.

18. One or more non-transitory machine-readable storage medium having program code executable by a processor to cause the processor to:
obtain one or more measurements associated with a drill bit drilling a borehole, the one or more measurements measured within a sliding window extending along the borehole from a current depth position of the drill bit backward a predetermined distance D along a longitudinal axis of the borehole;
weight the one or more measurements obtained within the sliding window to generate one or more weighted measurements;
estimate a set of model parameters based on the one or more weighted measurements; and
apply the estimated set of model parameters to a predictive model to generate an estimate of a current inclination of the drill bit.

19. The one or more storage medium of claim 18, wherein the predictive model generates the estimate of the current inclination of the drill bit using a least squares regression algorithm.

20. The one or more storage medium of claim 18, wherein the weighting of the one or more measurements comprises weighting each of the one or more measurements based on a relative position within the sliding window where each of the one or more measurements was taken.

* * * * *